S. G. CRANE.
ELECTRIC AUTOMATIC SCALE.
APPLICATION FILED APR. 3, 1915.
1,294,408.
Patented Feb. 18, 1919.
4 SHEETS—SHEET 3.
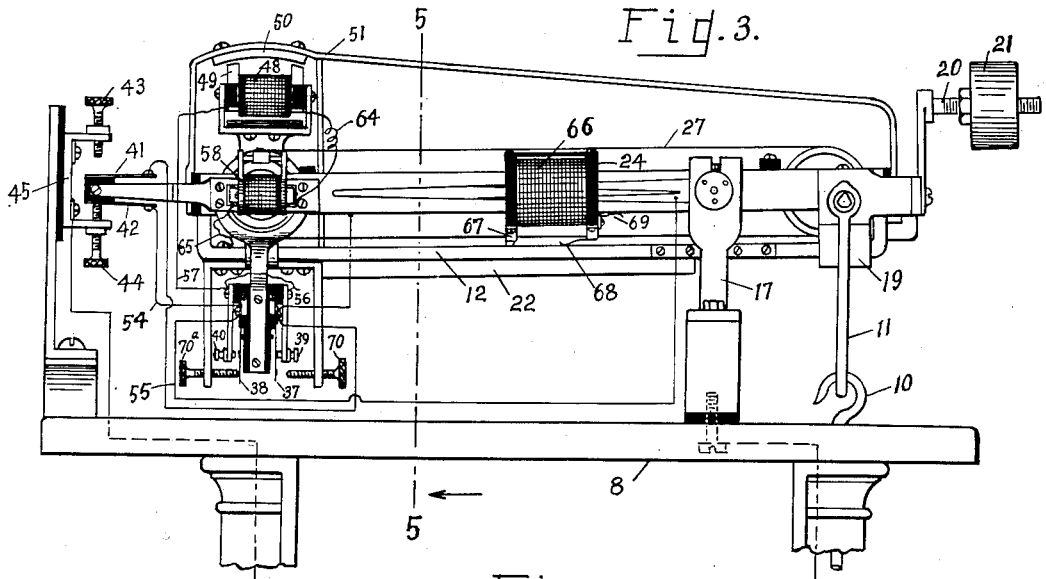
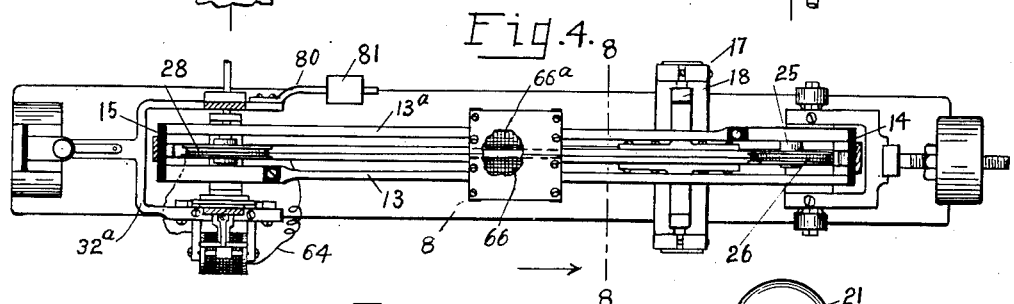
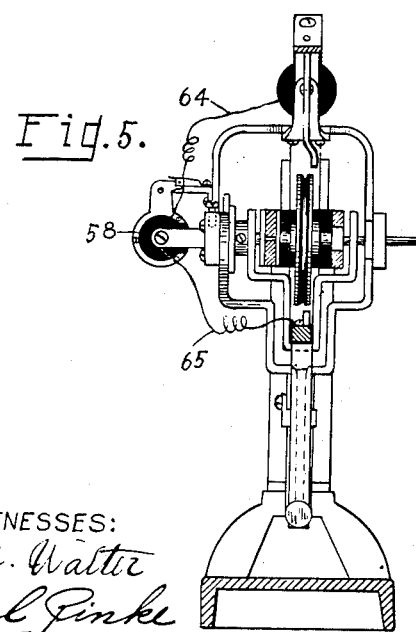
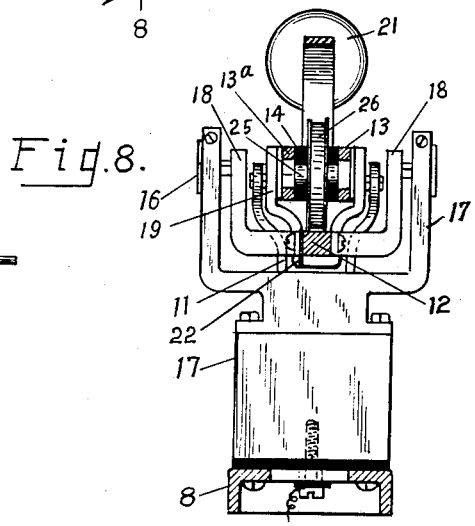
WITNESSES:
D. C. Walter
Carl Jinke
INVENTOR.
Samuel G. Crane
BY George R. Frye
ATTORNEY

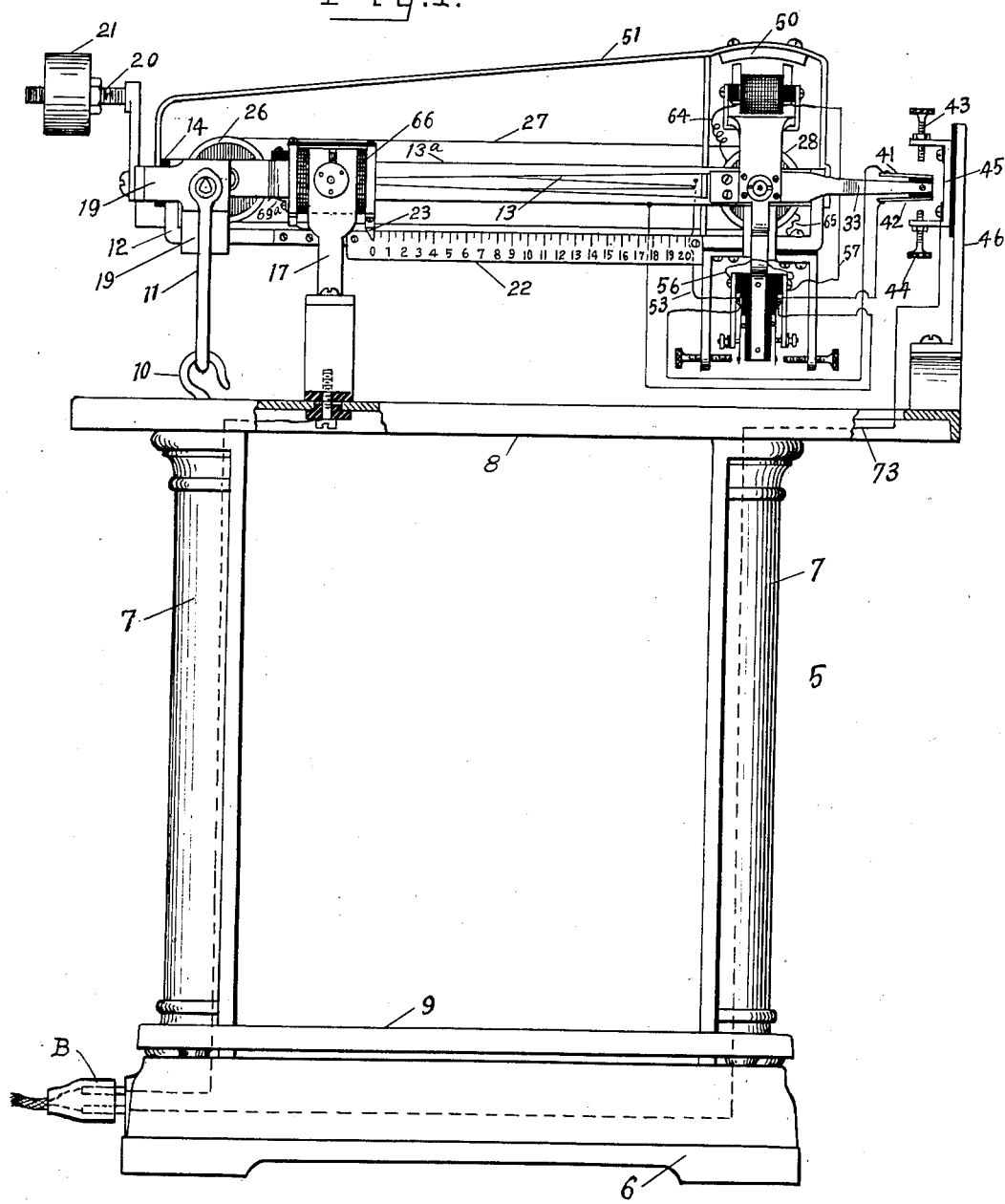

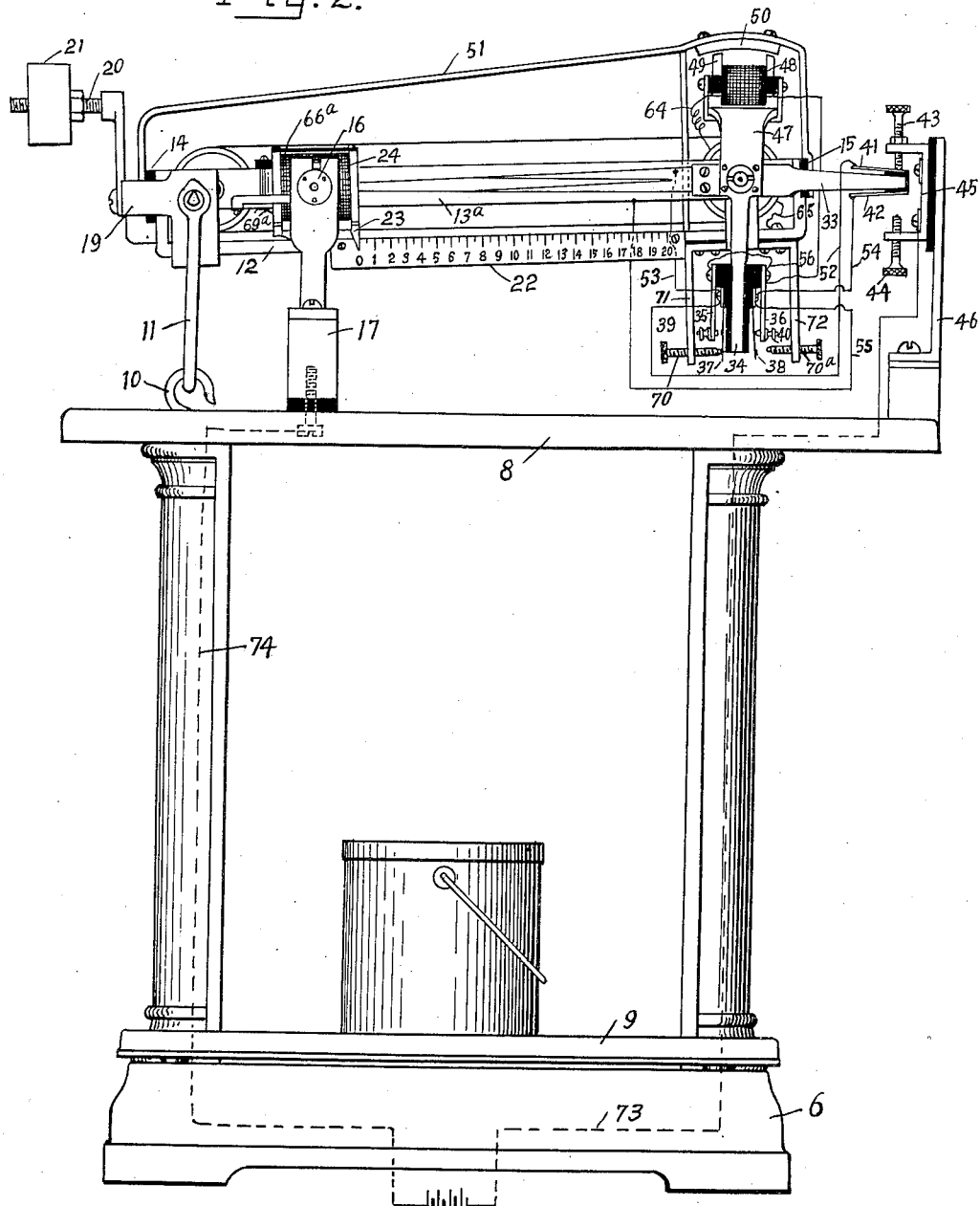

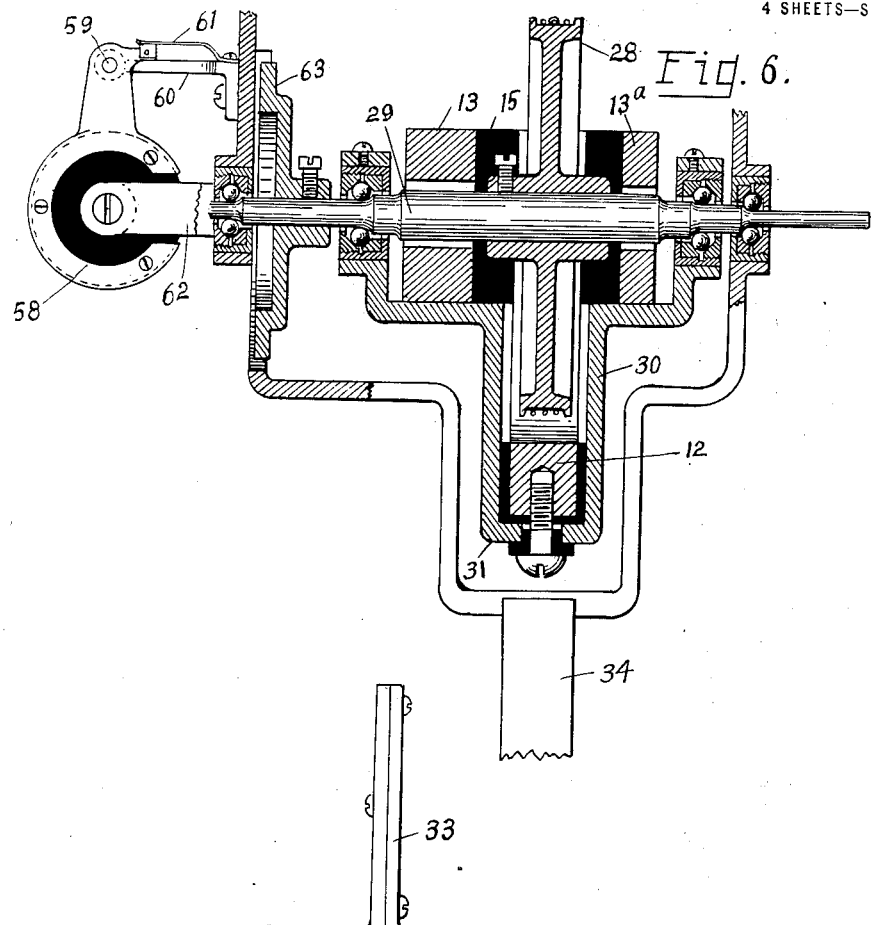
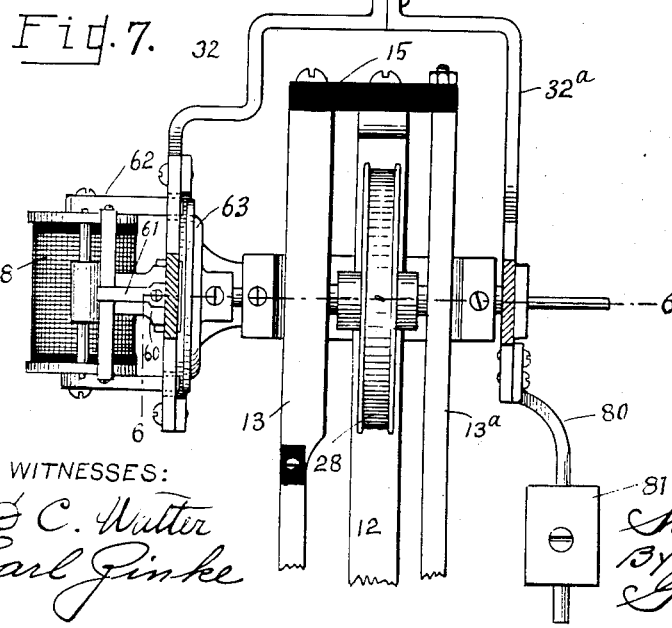

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

ELECTRIC AUTOMATIC SCALE.

1,294,408.

Specification of Letters Patent.   Patented Feb. 18, 1919.

Application filed April 3, 1915. Serial No. 18,893.

*To all whom it may concern:*

Be it known that I, SAMUEL G. CRANE, a citizen of the United States, residing at Toledo, in the county of Lucas and State of Ohio, have invented new and useful Improvements in Electric Automatic Scales, of which the following is a specification.

This invention relates to electric automatic scales and more particularly to that class of beam scales in which a poise for counter-balancing or offsetting the weight of a load upon the scale platform is automatically moved along the beam until equilibrium is established.

The primary object of this invention is to provide an automatic scale with electrically-actuated means for moving the poise along the scale beam until the beam balances, whereby the weight of an article or articles placed on the scale platform is accurately indicated by the adjusted position of the poise, the current for energizing the automatic means being under the control of the position and movement of the beam.

In the development of electric scales it has been found that when the poise is automatically advanced and returned along the scale beam, the momentum and impetus of the poise carry it beyond the counter-balancing point, and that before the poise comes to rest in exact counter balancing position it reciprocates frequently back and forth across the counter-balancing point. This invention has for one of its objects to obviate these unnecessary reciprocations of the poise and to bring it into exact registry with the counter-balancing point in the first instance by damping the movement of the poise as it approaches the counter-balancing point and synchronizing this dampened movement with the rise or fall of the scale beam from abnormal to balanced position.

With the above and other objects in view which will more readily appear after the invention is better understood, this invention consists in the novel construction, combination and arrangement of parts to be hereinafter more fully described and particularly pointed out in the subjoined claims.

Reference is to be had to the accompanying drawings, illustrating a preferred embodiment of my invention by way of exemplification, and wherein similar reference numerals designate similar parts throughout the several views.

In the drawings:—

Figure 1 is a front elevation with portions broken away of a scale embodying my invention, the scale being shown in its normal or balanced position with no load upon the scale platform.

Fig. 2 is a similar view showing the position the scale beam assumes the moment a load is placed upon the scale platform.

Fig. 3 is a rear elevation of the upper portion of the scale, showing the scale beam in the position it assumes after the load upon the platform has been weighed and removed.

Fig. 4 is a plan view of the scale beam.

Fig. 5 is a transverse sectional view taken substantially on the line 5—5 of Fig. 3.

Fig. 6 is an enlarged transverse sectional view taken substantially on the line 6—6 of Fig. 7.

Fig. 7 is an enlarged detail plan view of the free end of the scale beam and associated parts, and Fig. 8 is a transverse sectional view taken substantially on the line 8—8 of Fig. 4.

In the drawings, the reference numeral 5 designates the framework of the scale, which as herein shown, comprises a base 6 having a pair of columns 7 arranged adjacent the rear extremity thereof and connected at their upper ends by a crossbar 8. The base 6 is adapted to inclose the platform levers (not shown) supporting the platform 9 of the scale, and connections are made for rocking the scale beam from the platform levers upon the imposition of a load upon the platform 9 through the hook-rod 10 and yoke 11.

The scale beam, as herein shown, comprises a pair of parallel side beams 13 and 13ª and a lower arm 12 arranged substantially centrally of the side beams 13 and 13ª and connected to the end pieces 14 and 15 respectively, which end pieces are formed of insulating material and serve to join the ends of the side beams 13 and 13ª. The scale beam is fulcrumed intermediate its ends, as at 16, upon the bracket 17 carried by, but insulated from, the crossbar 8 of the scale, a U-shaped supporting member 18 being secured to the lower central arm 12 and extending upwardly, carrying knife-edge pivots adjacent its upper extremities co-acting with bearings carried by the bracket 17. A bracket 19 is secured to the lower central arm 12 adjacent the rear end thereof and carries a threaded adjusting member 20 adapted to receive the sealing weight 21 for adjustment relatively to the fulcrum of the beam in the usual manner.

A graduated rod 22 is suitably arranged upon the scale beam in any desired manner to co-act with the pointer 23 carried by the poise 24 in indicating the weight of articles upon the scale platform. As herein shown, the graduated rod 22 is secured to the lower central arm 12. Each of the side beams 13 and 13ª is composed of soft iron or similar magnetic material and is hollowed out substantially as shown to distribute the mass of iron irregularly, a tapered cut-out portion being removed from the side beams to so proportion the weight of each side beam that the center of mass thereof will be adjacent one of its ends, and an air-gap, of increasing and diminishing area will be also created between the upper and lower portions of the beams where traversed by the poise 24. These tapered cut-outs in the side beams 13 and 13ª are oppositely arranged so that the center of mass of one of the side beams, as 13, will be in a plane adjacent the opposite end of the beam from the center of mass of the other side beam 13ª, for purposes presently to be set forth.

Suitably journaled to rotate intermediate the side beams 13 and 13ª, as upon a stub shaft 25 carried by, but insulated from, one of these side beams, is an idler pulley 26 adapted to support an endless belt 27, which belt is also wrapped around the drive pulley 28 for several revolutions (see Fig. 6), being fixedly secured to the periphery of the pulley 28, as by pins or other suitable fastening elements. The pulley 28 is secured upon a rotatable shaft 29 mounted within the arms 30 of an upstanding bracket 31 secured to, but insulated from, the central lower rod 12 (see Fig. 6), the shaft 29 passing through apertures in the side beams 13 and 13ª.

Mounted to swing about the shaft 29 is a pivoted switch carrying frame 32, which is formed with a normally horizontal portion 32ª extending forwardly in alinement with the side beams 13 and 13ª and terminating in a nose 33 (see Fig. 7) arranged in advance of the side beams, and a depending portion 34 arranged substantially at right angles to the horizontal portion and carrying oppositely-disposed insulating blocks on which are secured switch members substantially as hereinafter described. These switch members comprise a pair of downwardly extending conducting arms 35 and 36, secured at their upper extremities upon the opposite insulating blocks, and depending spring contact members 37 and 38 secured to the insulating blocks adjacent the arms 35 and 36 respectively and adapted to normally contact with adjustable contact screws 39 and 40 arranged upon the lower portions of these conducting arms. The screws or similar fastening elements securing these arms and spring contact members upon the insulating blocks are also utilized as binding posts for connecting the current conducting wires as hereinafter described. Arranged upon and insulated from the nose 33 of the beam are upper and lower contact plates 41 and 42 which are respectively arranged to contact with the upper and lower contact screws 43 and 44 adjustably mounted in the loop 45 secured to, but insulated from, the bracket 46 supported upon the crossbar 8 of the scale. Extending upwardly from the shaft 29 substantially in alinement with the depending portion 34, the frame 32 is formed with a bracket 47 adapted to support the magnetic field piece 48, the poles 49 of which are arranged closely adjacent the soft iron member 50 suitably secured to a frame 51 carried by the insulating end pieces 14 and 15 (see Figs. 2 and 3). The magnetic field piece 48 is so related to the soft iron member 50 that when their centers of mass are in alinement, the pivoted frame 32 is disposed with the horizontal portion 32ª in alinement with the side beams 13 and 13ª.

The upper contact plate 41 carried upon the nose of the scale is electrically connected, as by means of the wire 52, with the binding post securing the spring contact member 37 to the insulating block (see Fig. 2), a wire 53 being also secured to this binding post and leading to the side beam 13. Similarly the lower contact plate 42 is electrically connected, as by the wire 54, with the binding post securing the spring contact member 38 to its insulating block, a wire 55 leading from this binding post to the other side beam 13ª. The binding posts of the conducting arms 35 and 36 are electrically connected, as by the wire 56, and a wire 57 (Fig. 1) leads from one of these binding posts to the magnetic field piece 48 for energizing said field. Connected in series with the magnetic field piece 48, as through the wire 64, is a magnetic clutch 58 comprising a coil arranged to swing upon the pivot 59 carried by the bracket 60 (see Fig. 6), a leaf spring 61 being suitably disposed to normally throw the coil 58 outwardly so that the poles 62 of the clutch will be spaced from the soft iron disk 63 which is suitably affixed to the shaft 29 adjacent one end thereof. A wire 65 electrically connects the magnetic clutch 58 with the central lower rod 12 of the scale beam. The bracket 71 is connected to, but insulated from, the lower surface of the central rod 12 and is provided with depending arms 72 carrying adjustable stop-members 70 and 70ᵃ respectively adapted to engage the spring contact members 37 and 38 during the operation of the scale.

The poise 24 adapted to be automatically moved relatively to the scale beam comprises a pair of solenoid coils 66 and 66ᵃ (see Fig. 4) connected to each other for simultaneous movement and arranged to surround the side beams 13 and 13ᵃ respectively, the poise being suitably fastened to the endless belt 27 as by means of clamps 67 carried upon the lower portion of the poise. One end of the wire forming each of the solenoid coils 66 and 66ᵃ is connected to the metallic brush 68 contacting the upper surface of the lower central rod 12 of the beam, which forms a common conducting medium, the opposite ends of the coils being connected respectively with metallic brushes 69 and 69ᵃ arranged to contact the lower surface of the side beams 13 and 13ᵃ respectively. The pointer 23 is suitably carried adjacent one end of the poise as clearly shown in Figs. 1 and 2.

The principle utilized for automatically moving the poise along the scale beam is that whenever an electric solenoid coil is energized it will attract a movable core (or be attracted by a fixed core if the solenoid is movable) and the core and solenoid will be moved relatively to each other until the centers of mass of the solenoid and core coincide. By making the side beams 13 and 13ᵃ of magnetic material so as to form substantially a core for the solenoids 66 and 66ᵃ, an arrangement is effected whereby these solenoids, which are connected together to act as a single poise, will be moved along the scale beam in a forward or reverse direction when one or the other of the solenoids is energized. When, in the operation of the scale, the solenoid 66 is energized, it will, according to the well-known action of solenoids with relation to their cores, be drawn toward the center of mass of the soft iron side beam 13, which here operates as the core of this solenoid 66, and the solenoid 66ᵃ when energized, will be suitably drawn toward the center of mass of the side beam 13ᵃ, which, as above stated, is adjacent the opposite end of the beam from the center of mass of the side beam 13. It will be apparent, therefore, that to secure a movement of the poise in one direction, the solenoid coil 66 must be energized, while to secure a movement of the poise in the opposite direction, the other solenoid 66ᵃ must be energized. Thus in a scale assembled as shown in Fig. 1, to secure an advance movement of the poise—i. e., away from the fulcrum of the beam—the solenoid 66 surrounding the side beam 13 whose center of mass is farthest removed from the fulcrum will be energized, and to secure a return movement, or movement toward the fulcrum of the beam, the solenoid 66ᵃ will be energized, the center of mass of this beam 13ᵃ being adjacent the fulcrum point 16.

Assuming now that the scale is in its normal position, as shown in Fig. 1, with the pointer 23 registering with the zero graduation on the rod 22, when an article is placed upon the scale platform the scale beam will be rocked upwardly into substantially the position shown in Fig. 2, and connections will be made whereby the solenoid 66 will be energized to move the poise away from the fulcrum of the beam. It will be noted that upon the imposition of a load upon the scale platform the upward movement of the free end of the scale beam quickly brings the upper contact plate 41 into engagement with the upper contact screw 43, stopping the upward movement of the horizontal portion 32ᵃ of the pivoted switch carrying frame 32, and further upward rocking of the scale beam carries the side beams 13 and 13ᵃ out of alinement with the horizontally-disposed portion of the switch carrying frame and forces the adjustable stop member 70 mounted in the depending arm 72 of the bracket 71 into engagement with the spring contact member 37 so as to separate this spring contact member from the adjustable contact screw 39, as clearly shown in Fig. 2. Simultaneously the frame 51 secured to the end pieces 14 and 15 of the scale beam swings the soft iron member 50 relatively to the poles 49 of the magnetic field piece 48 so that the centers of mass of these elements are no longer in alinement. (See Fig. 2).

When the scale beam is swung to substantially the position shown in Fig. 2, a circuit is formed to energize the solenoid 66 as follows: from the batteries or other source of current through the wire 73 to the loop 45 carrying the upper contact screw 43, thence through the upper contact plate 41 and wire 52 to the binding post secured to the spring contact member 37. As at this time the spring contact member 37 is separated from the contact screw 39, the current can not continue through the spring contact member and conducting arm 35 to the magnetic field piece 48 and magnetic clutch 58, this path of travel being cut off because of the gap between the spring contact member 37 and the screw 39. Accordingly, the current passes from this binding post by means of the wire 53 to the side beam 13, through this side beam and the brush 69 to the solenoid coil 66, thence through the solenoid coil and the brush 68 to the lower central rod 12, from which rod return is made to the batteries or other source of current through the arms of the supporting member 18, the bracket 17 and the wire 74.

The completion of this circuit as above described upon the engagement of the upper contact plate 41 with the contact screw 43 energizes the solenoid 66, which moves along the scale beam toward the center of mass of the side beam 13 until it approaches a counter-balancing position on the scale beam, moving the endless belt around and turning the idler pulley 26 and wrapping certain portions of the belt around the drive pulley 28 while unwrapping other portions therefrom. As the poise approaches the counter-balancing point on the scale beam, the beam falls, gradually bringing the free end of the scale beam into alinement with the horizontal portion 32ª of the pivoted frame and swinging the arm 72 of the bracket 71 so as to allow the spring contact member 37 resting against the stop member 70 to approach the contact screw 39, against which screw 39 it contacts as soon as the beam in falling moves the stop member 70 to a position wherein its inner end is in alinement with the inner end of the contact screw 39, at which time the contact plate 41 is still in contact with the contact screw 43 to allow the current to flow for energizing the poise and the poise still has a relatively small distance to travel to reach the counter-balancing point. Attention is here called to the fact that by adjusting the stop member 70 the distance remaining for the poise to travel after contact of the spring 37 with the screw 39 may be varied at will. As soon as the spring contact member 37 engages the contact screw 39, the energizing current is divided, a portion continuing to pass over the wire 53 to the side beam 13 as above described to energize the coil 66, and a second portion flowing through the spring contact arm 37, the conducting arm 35 and wire 57 to and through the magnetic field piece 48, thence through the wire 64 to the magnetic clutch 58, through the coil of said clutch and the wire 65 to the lower central rod 12 of the scale beam, from which return is made to the batteries or other source of current as in the circuit first described.

Immediately upon the energization of the magnetic field piece 48 and clutch 58 the poles 62 of the clutch will be drawn into engagement with the soft iron disk 63, locking the pivoted frame to which the clutch is attached with the rotatable shaft 29 to which the disk 63 is attached, so that any movement of the pivoted frame relatively to the side beams 13 and 13ª will be communicated to the shaft 29 and accordingly to the drive pulley 28 fixed on said shaft. A rotative movement is exerted upon the pivoted frame upon the energization of the magnetic field piece 48 which is drawn to a position wherein its center of mass alines with the center of mass of the soft iron member 50 and carries the pivoted frame therewith in its movement. This relatively small rotative movement swings the clutch 58 through a small arc, and through the disk 63 and shaft 29 this movement is communicated to the drive pulley 28, rotating the drive pulley to wrap a portion of the belt 27 therearound and advance the poise a slight distance under this pull exerted upon the belt 27. The rotative movement exerted upon the pivoted frame by the energization of the magnetic field piece 48 also serves to hold the contact plate 41 carried by the horizontal portion 32ª of the pivoted frame in engagement with the contact screw 43 until the advance movement of the poise brings it exactly to the counter-balancing point, at which time the scale beam has rocked into position again alining the side beams 13 and 13ª with the horizontal portion 32ª of the pivoted frame, and the horizontal portion 32ª of the pivoted frame and the scale beam are together rocked from the position shown in Fig. 2 to a balanced position substantially as shown in Fig. 1 with the contact plate 41 separated from the contact screw 43. Further, it may be noted that the energization of the clutch 58 and field piece 48 provide means for damping the movement of the poise and preventing the momentum of the poise from carrying it beyond the counter-balancing point on the scale beam because of the fact that any movement of the poise after the energization of the magnetic clutch 58 and field piece 48 is communicated through the belt 27 to the drive pulley 28 and the shaft 29, which shaft is now locked to the magnetic clutch 58 carried by the pivoted frame so that any rotative movement of the pulley 28 and shaft 29 must be communicated to and exerted upon the pivoted frame and would tend to carry the magnetic field piece 48 beyond its position in alinement with the center of the magnetic member 50, against the magnetic force tending to hold the field piece in such alined position as long as the current passes. The magnetic field piece 48 in this portion of its action resembles a magnetic brake and effectively checks the advance movement of the poise and holds the pivoted frame in locked position relatively to the scale beam so that any further rocking movement of the scale beam also moves the horizontal portion 32ᵃ of the frame away from the contact screw 43.

The separation of the contact plate 41 from the contact screw 43 breaks the circuit, deënergizing the poise 24, field piece 48 and clutch 58 respectively, and the beam is free to rock on its fulcrum in its load-offsetting movements with none of the electrical apparatus of the scale beam in energization to in any manner affect its load-offsetting movements.

Should, however, the poise advance beyond the counter-balancing position on the beam, the beam will fall until the lower contact plate 42 engages the lower contact screw 44 carried by the loop 45 and a circuit is formed for energizing the other solenoid coil 66ᵃ to return the poise toward the counter-balancing point, this circuit being as follows: from the batteries or other source of current to the loop 45 as in the circuit first described for energizing the coil 66, thence through the lower contact screw 44, contact plate 42 and wire 54 to the binding post secured to the spring contact member 38, from which binding post the wire 55 leads to the side beam 13ᵃ, thence through the beam 13ᵃ and metallic brush 69ᵃ to the solenoid coil 66ᵃ of the poise, thence through the poise and the brush 68 to the lower central rod 12, from which return is made to the batteries or other source of current as in the circuit first described.

Should the poise be beyond the counter-balancing point such a slight distance that after the engagement of the plate 42 with the contact screw 44, the beam does not continue to move relatively to the pivoted frame a distance sufficient to bring the adjustable stop member 70ᵃ into engagement with the spring contact member 38 so as to separate this spring contact member from the contact screw 40, the current will also pass from the wire 54 through the spring contact member 38, conducting arm 36 and wire 56 (connecting the conducting arms 35 and 36) to the wire 57 (see Fig. 3), the current then continuing through the wire 57 to and through the magnetic field piece 48, thence through the wire 64, the magnetic clutch 58, and the wire 65 to the lower central rod 12, from which return is made to the batteries or other source of current. The energization of the clutch 58 and field piece 48, as described, will serve to throw the field piece 48 from its abnormal movement due to the shifting of the beams relatively to the frame under the weight of the poise after the plate 42 engaged the contact screw 44 into position wherein its center of mass alines with the center of the magnetic member 50, thus rotating the pivoted frame through an arc exactly corresponding to the displacement of the pivoted frame due to the travel of the scale beam after the contact of the plate 42 with the screw 44, and this rotative movement is communicated through the clutch 58 and disk 63 to the drive pulley 28 serving to unwind a portion of the belt 27 therefrom so as to allow the poise 24 to return to the counter-balancing position on the scale beam.

As soon as the load upon the scale platform is removed, the beam will fall into substantially the position shown in Fig. 3, the pivoted frame falling with the beam until the plate 42 engages the contact screw 44 and then remaining substantially stationary while the beam continues to fall. The continuing movement of the beam brings the stop member 70ᵃ into engagement with the spring contact member 38 and separates this spring contact member from the contact screw 40, as clearly shown in Fig. 3. The current then passes from the contact plate 42 through the wires 54 and 55 to the beam 13ᵃ, thence to and through the solenoid coil 66ᵃ and the brush 68 to the lower central rod 12, returning therefrom to the batteries as before described. This energization of the solenoid coil 66ᵃ tends to move it toward the center of mass of the side beam 13ᵃ, which, as above described, is adjacent the fulcrum point 16 of the beam. As the poise in its return movement approaches the fulcrum of the beam, the stop member 70ᵃ is gradually moved so that the spring contact member 38 approaches the contact screw 40, against which it contacts as soon as the poise reaches a position closely adjacent the point on the beam wherein the beam is balanced without any load upon the scale platform, the desired proximity of this position before contact of the spring 38 with the screw 40 being regulated by adjustment of the stop member 70ᵃ. When the spring contact member 38 engages the contact screw 40 the magnetic field piece 48 and clutch 58 are energized and serve to check the advance movement of the poise as above described and drive the poise the remaining distance to bring it to the counter-balancing point on the scale beam and at the same time allow the horizontal portion 32ᵃ of the pivoted frame to move upwardly from engagement with the contact screw 44 into substantially the position shown in Fig. 1, wherein the beam is balanced with none of the electric mechanisms energized.

From the foregoing it will be apparent that means have been provided for energizing the poise 24 to advance and return the same from and toward the fulcrum point of the beam, and that when said poise approaches a counter-balancing position on the scale beam its movement is checked or dampened, the poise being then brought into accurate registry with the counter-balancing point simultaneously with the movement of the nose 33 of the scale beam from its displaced or abnormal position to its balanced position.

Further, the means for checking or braking the movement of the poise are controlled by the movement of the scale beam, as are the means for energizing the poise to advance or return it along the scale beam; and separate means for regulating the extent of the checked or dampened movement of the poise in its advance and return movements have been provided, various adjustments allowing minute changes being provided throughout the adjustable contact screws 39, 40, 43 and 44, and the adjustable stop members 70 and 70$^a$.

If desired, the base 6 of the scale may inclose batteries A, dry cells or any similar source of electric current to energize the electric mechanisms employed in connection with this scale, though connection with other sources of energy may also be made through the plug B, in which case the batteries A are not required and may be eliminated. By way of example I have illustrated in Fig. 1 a scale wired to employ a plug connection for utilization with outside sources of energy, while in Fig. 2 I have illustrated a scale wired so as to employ batteries, dry cells or the like inclosed within the base 6 of the scale.

To allow for accurate balancing of the pivoted frame upon the shaft 29, the arm 80 may be secured upon the side of the horizontal portion 32 opposite that carrying the magnetic clutch 58, and an adjustable weight 81 may be provided for movement upon said arm. (See Fig. 4).

It is to be understood that the scale illustrated herein is shown merely by way of exemplification, and that many variations, modifications and changes may be resorted to without departing from the spirit and scope of my invention, which is defined in the claims hereinafter set forth in such terms as to distinguish it from the prior art so far as known to me, though it is not my intention to relinquish or abandon any portion of the invention.

Having described my invention, I claim:

1. In an electric scale, in combination, weighing mechanism including a scale beam and a poise automatically movable relatively thereto, means for moving said poise, means for damping the movement of the poise during a portion of its travel, and means whereby the dampened movement of the poise is synchronized with the rocking movement of the scale beam.

2. In an electric scale, in combination, weighing mechanism including a scale beam and a poise automatically movable relatively thereto, means for moving said poise, electrically-actuated means for damping the movement of the poise during a portion of its travel, and means whereby the dampened movement of the poise is synchronized with the rocking movement of the scale beam.

3. In an electric scale, in combination, a scale beam, a poise automatically movable relatively thereto, a pivoted frame arranged adjacent one end of the scale beam and adapted to be swung relatively to the scale beam when the beam is rocked, means for moving the poise along the scale beam, and means controlled by the position of the beam carried by the pivoted frame for damping the movement of the poise during a portion of its travel.

4. In an electric scale, in combination, a scale beam, a poise automatically movable relatively thereto, a pivoted frame arranged adjacent one end of the scale beam and adapted to be swung relatively to the scale beam when the beam is rocked, means controlled by the position of the beam for moving the poise along the scale beam, and electrically-actuated means carried by the pivoted frame for damping the movement of the poise during a portion of its travel.

5. In an electric scale, in combination, a scale beam, a poise automatically movable relatively thereto, a pivoted frame arranged adjacent the free end of the scale beam and adapted to be swung relatively to the scale beam when the beam is rocked, electrical means for moving the poise including a circuit, and connections carried by the pivoted frame arranged to be moved into position upon the rocking of the scale beam to complete the circuit whereby the poise will be moved along the scale beam, and means carried by the pivoted frame for damping the movement of the poise during a portion of its travel.

6. In an electric scale, a scale beam composed of parallel side beams of magnetic material, a poise automatically movable relatively to the side beams, a pivoted frame arranged adjacent one end of the scale beam and having a portion normally in alinement with the side beams, said frame being adapted to be swung relatively to the scale beam when the beam is rocked, electrical means for moving the poise including a circuit, and connections carried by the pivoted frame for completing the circuit through certain of the side beams upon the rocking of the scale beam whereby the poise will be automatically moved along the scale beam.

7. In an electric scale, a scale beam composed of parallel side beams of magnetic material, a poise automatically movable relatively to the side beams, a pivoted frame arranged adjacent one end of the scale beam and having a portion normally in alinement with the side beams, said frame being adapted to be swung relatively to the scale beam when the beam is rocked, electrical means for moving the poise including a circuit, and connections carried by the pivoted frame for completing the circuit through certain of the side beams upon the rocking of the scale beam whereby the poise will be automatically moved along the scale beam, and means carried by the pivoted frame for damping the movement of the poise.

8. In an electric scale, a scale beam composed of parallel side beams of magnetic material, a poise automatically movable relatively to the side beams, a pivoted frame arranged adjacent one end of the scale beam and having a portion normally in alinement with the side beams, said frame being adapted to be swung relatively to the scale beam when the beam is rocked, electrical means for moving the poise including a circuit, and connections carried by the pivoted frame for completing the circuit through certain of the side beams upon the rocking of the scale beam whereby the poise will be automatically moved along the scale beam, and electrically-actuated means carried by the pivoted frame for damping the movement of the poise.

9. In an electric scale, a scale beam composed of parallel side beams of magnetic material, a poise automatically movable relatively to the side beams, a pivoted frame arranged adjacent one end of the scale beam and having a portion normally in alinement with the side beams, said frame being adapted to be swung relatively to the scale beam when the beam is rocked, electrical means for moving the poise including a circuit and connections carried by the pivoted frame for completing the circuit through certain of the side beams upon the rocking of the scale beam whereby the poise will be automatically moved along the scale beam, and magnetic means carried by the pivoted frame for damping the movement of the poise.

10. In an electric scale, a scale beam composed of parallel side beams of magnetic material, a poise automatically movable relatively to the side beams, a pivoted frame arranged adjacent one end of the scale beam and having a portion normally in alinement with the side beams, said frame being adapted to be swung relatively to the scale beam when the beam is rocked, electrical means for moving the poise including a circuit, and connections carried by the pivoted frame for completing the circuit through certain of the side beams upon the rocking of the scale beam whereby the poise will be automatically moved along the scale beam, and means carried by the pivoted frame for damping the movement of the poise during a portion of its travel.

11. In an electric scale, in combination, a scale beam, a poise automatically movable relatively thereto, a pivoted frame arranged adjacent one end of the scale beam and adapted to be swung relatively to the scale beam when the beam is rocked, means under the control of the movement of the scale beam for moving the poise, a plurality of switches carried by the pivoted frame and arranged to be opened or closed by the movement of the scale beam, and electrical means for damping the movement of the poise actuated upon the closings of certain of the switches by the relative movement of the frame to the beam.

12. In an electric scale, in combination, a scale beam, a poise automatically movable relatively thereto, a pivoted frame arranged adjacent one end of the scale beam and adapted to be swung relatively to the scale beam when the beam is rocked, electro-magnetic mechanisms carried by the pivoted frame for assisting in positioning the frame in line with the beam, switches carried by the pivoted frame in circuit with said electro-magnetic mechanisms, means for moving the poise along the scale beam under the control of the rocking of the scale beam, and means carried by the scale beam arranged to open and close said switches according to the rocking movement of the scale beam.

13. In an electric scale, weighing mechanism including a sectional scale beam and a poise automatically movable relatively thereto, a pivoted frame arranged adjacent one end of the scale beam, electrical energizing means including separated contact members arranged adjacent the pivoted frame, and contact members carried by the pivoted frame arranged to engage the first-mentioned contact members upon the rocking of the scale beam whereby a circuit is completed to move the poise relatively to the scale beam.

14. In an electric scale, weighing mechanism including a sectional scale beam and a poise automatically movable relatively thereto, a pivoted frame arranged adjacent one end of the scale beam, electrical energizing means including separated contact members arranged adjacent the pivoted frame, and contact members carried by the pivoted frame arranged to engage the first-mentioned contact members upon the rocking of the scale beam, whereby a circuit is completed to move the poise relatively to the scale beam, and electrical means carried by the pivoted frame for damping the movement of the poise during a portion of its travel.

15. In an electric scale, weighing mechanism including a sectional scale beam and a poise automatically movable relatively thereto, a pivoted frame arranged adjacent one end of the scale beam, electrical energizing means including separated contact members arranged adjacent the pivoted frame and contact members carried by the pivoted frame arranged to engage the first-mentioned contact members upon the rocking of the scale beam whereby a circuit is completed to move the poise relatively to the scale beam, and magnetic means carried by the pivoted frame for damping the movement of the poise during a portion of its travel.

SAMUEL G. CRANE.

Witnesses:
H. H. BERGEN,
C. WM. FESSENDEN.